United States Patent
Rowley et al.

(10) Patent No.: US 8,332,493 B2
(45) Date of Patent: Dec. 11, 2012

(54) DIRECTORY SERVER PLUG-IN CALL ORDERING

(75) Inventors: Peter Rowley, Ben Lemond, CA (US); Noriko Hosoi, Palo Alto, CA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/315,217

(22) Filed: Dec. 8, 2011

(65) Prior Publication Data
US 2012/0084409 A1  Apr. 5, 2012

Related U.S. Application Data

(63) Continuation of application No. 11/712,021, filed on Feb. 28, 2007, now Pat. No. 8,095,625.

(51) Int. Cl.
*G06F 15/177* (2006.01)

(52) U.S. Cl. ....................................................... 709/220

(58) Field of Classification Search .................. 709/220, 709/221
See application file for complete search history.

(56) References Cited

U.S. PATENT DOCUMENTS

| | | | |
|---|---|---|---|
| 7,197,555 B1 | 3/2007 | Sheikh | |
| 2002/0198888 A1* | 12/2002 | Young | 707/100 |
| 2003/0120706 A1 | 6/2003 | Harjula | |
| 2003/0191757 A1 | 10/2003 | Ambrosini et al. | |
| 2004/0044909 A1 | 3/2004 | Mirza et al. | |
| 2004/0158575 A1 | 8/2004 | Jacquemot et al. | |
| 2005/0015763 A1 | 1/2005 | Alexander et al. | |
| 2005/0190755 A1 | 9/2005 | Singh et al. | |
| 2006/0010232 A1* | 1/2006 | Page et al. | 709/223 |
| 2006/0123024 A1 | 6/2006 | Sathyanarayan et al. | |
| 2006/0168203 A1 | 7/2006 | Levillain et al. | |
| 2006/0200453 A1 | 9/2006 | Santrosyan et al. | |
| 2007/0050331 A1 | 3/2007 | Bauman et al. | |
| 2007/0245356 A1 | 10/2007 | Ari et al. | |
| 2007/0294388 A1 | 12/2007 | Yu | |
| 2008/0071811 A1 | 3/2008 | Parkinson et al. | |
| 2008/0134286 A1 | 6/2008 | Amdur et al. | |
| 2008/0147787 A1 | 6/2008 | Wilkinson et al. | |
| 2008/0320144 A1 | 12/2008 | Stewart et al. | |

OTHER PUBLICATIONS

Red Hat Office Action for U.S. Appl. No. 11/712,021 mailed Aug. 1, 2011.
Red Hat Office Action for U.S. Appl. No. 11/712,021 mailed May 11, 2011.
Red Hat Office Action for U.S. Appl. No. 11/712,021 mailed Nov. 26, 2010.
Red Hat Office Action for U.S. Appl. No. 11/712,021 mailed Jun. 18, 2010.
Red Hat Advisory Action for U.S. Appl. No. 11/712,021 mailed Apr. 13, 2010.

(Continued)

*Primary Examiner* — Jason Recek
(74) *Attorney, Agent, or Firm* — Lowenstein Sandler PC (57) ABSTRACT

A method and apparatus for ordering callbacks for server plug-ins of a Lightweight Directory Access Protocol (LDAP) directory server. Each plug-in registers with the LDAP server and has a designated priority and set of dependencies. The priority and dependency data are stored in an LDAP callback configuration entry or set of entries. The LDAP server analyzes the priority and dependencies to determine the order of each plug-in or individual callback relative to one another. This allows the LDAP directory server and LDAP operations to rely on the order of callbacks thereby improving the efficiency of the system.

20 Claims, 7 Drawing Sheets

OTHER PUBLICATIONS

Red Hat Office Action for U.S. Appl. No. 11/712,021 mailed Feb. 22, 2010.
Red Hat Office Action for U.S. Appl. No. 11/712,021 mailed Oct. 15, 2009.
Red Hat Office Action for U.S. Appl. No. 11/712,021 mailed May 14, 2009.
Red Hat Notice of Allowance for U.S. Appl. No. 11/712,021, mailed Sep. 1, 2011.

* cited by examiner

DIRECTORY SERVER PLUG-IN CALL ORDERING

CROSS-REFERENCE TO RELATED APPLICATIONS

This application is a continuation of U.S. Nonprovisional patent application Ser. No. 11/712,021 filed Feb. 28, 2007, now U.S. Pat. No. 8,095,625 entitled "Directory Server Plug-In Call Ordering," which is incorporated herein by reference for all purposes.

TECHNICAL FIELD

Embodiments of the present invention relate to the order in which calls to server plug-ins are executed. Specifically, the embodiments relate to a method and apparatus for configuring the order in which calls to server plug-ins are executed.

BACKGROUND

The Light Weight Directory Access Protocol (LDAP) has become very popular due to its efficient and fast data access. A large number of applications/services are currently in use and being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes and each entry has an objectClass attribute containing named classes defined in the schema. The objectClass attribute may be multivalued and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person." Membership in the "person" class would require the entry to contain the "sn" and "cn" attributes and allow the entry also to contain "userPassword," "telephoneNumber" and other attributes.

The LDAP directory may be maintained by an LDAP directory server. The LDAP directory server may include a set of modules or services that are available to the server as plug-in modules. The plug-in modules each register with the LDAP directory server during a start up sequence. The registration process make the plug-in modules known to the LDAP directory server as well as the functions that are available from each plug-in. The functions may be referred to as 'calls' or 'callbacks.' For sake of clarity these functions are referred to herein as 'callbacks. The order that callbacks are executed by an LDAP directory server are not guaranteed, but correspond to the order in which the respective plug-in modules are registered with the LDAP directory server. Thus, LDAP operations that utilize plug-in callbacks cannot rely on the order of their execution and such operations must be utilized or programmed in accordance with this limitation to ensure data coherency.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for ordering callbacks for server plug-ins of a Lightweight Directory Access Protocol (LDAP) directory server. Each plug-in registers with the LDAP directory server and has a designated priority and set of dependencies. The priority and dependency data are stored in an LDAP callback configuration entry or set of entries. The LDAP directory server analyzes the priority and dependencies to determine the order of each plug-in or individual callback relative to one another. This allows the LDAP directory server and LDAP operations to rely on the order of callbacks thereby improving the efficiency of the system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media; optical storage media, flash memory devices or other type of machine-accessible storage media.

Figure 1:
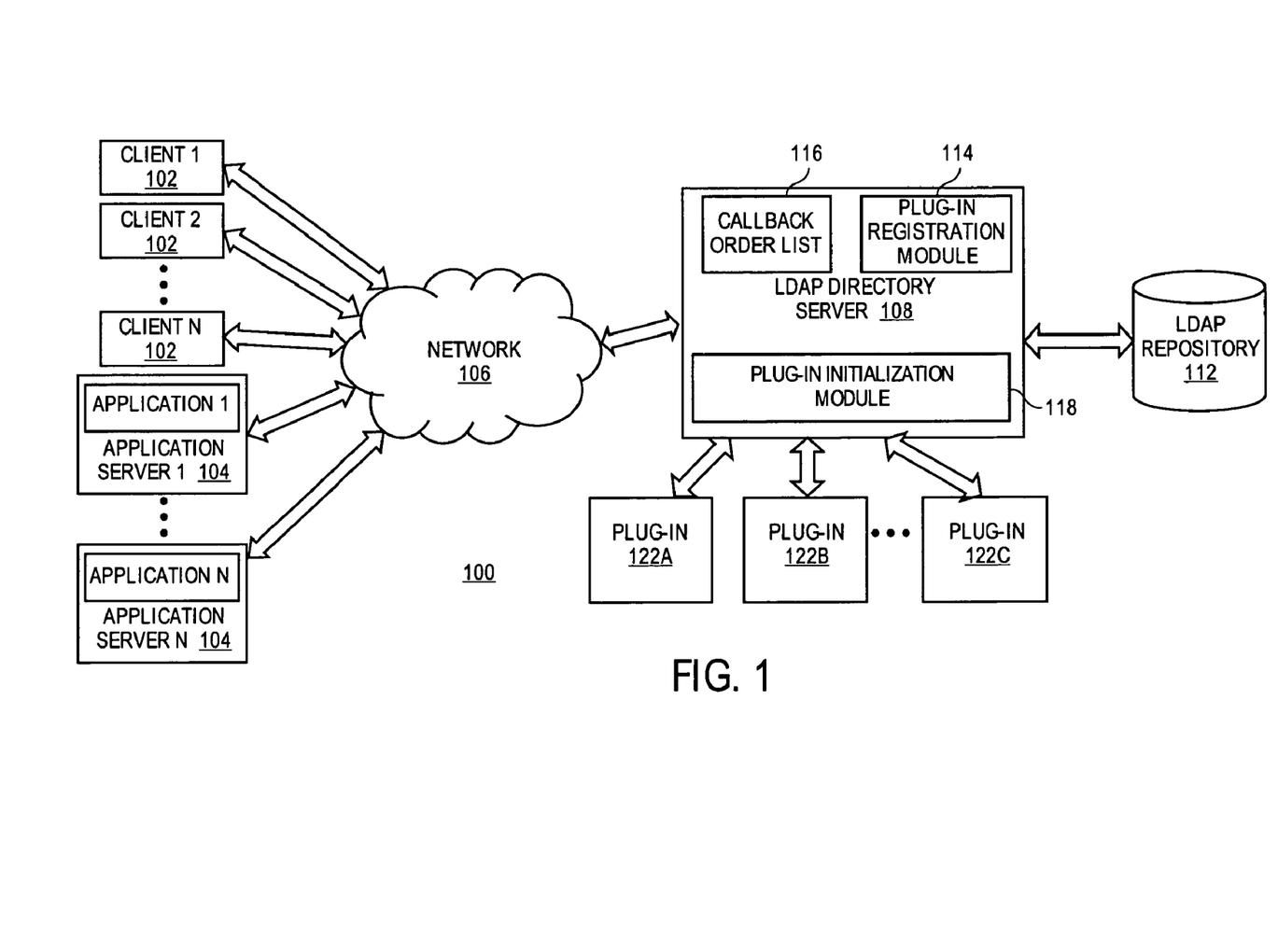
FIG. 1 is a diagram of one embodiment of a network and system including a lightweight directory access protocol (LDAP) server.

FIG. 1 is a diagram of one embodiment of a network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs) or similar devices capable of communicating over the network 106 and running an LDAP client.

The clients 102 are coupled to the LDAP directory server 108 via the network 106, which may be a public network (e.g., Internet) or a private network (e.g., a virtual local area network (VLAN)). The network 106 may be a wide area network (WAN), such as the Internet, a local area network (LAN) or similar type of network. The LDAP directory server 108 may contain a server front-end responsible for network communications, plug-ins or modules for server functions (such as access control and replication), a basic directory tree containing server-related data and a database, back-end plug-in responsible for managing the storage and retrieval of LDAP repository data and similar components.

In one embodiment, the clients 102 communicate with the LDAP directory server 108 via a web server (not shown). For example, the clients 102 may execute web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communication with the LDAP directory server 108. Similar to the clients 102, the application servers 104 may communicate with the LDAP directory server 108 directly or via a web server.

The LDAP repository 112 may be part of the LDAP directory server 108 or it may reside externally (e.g., on a database server). The LDAP repository 112 may contain a tree of data entries. The structure of the entries may be specified in the definition of the LDAP repository 112. The definition of the LDAP repository 112 may be represented as a schema, a table or some other data structure and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class that an entry belongs to defines what kind of object the entry may represent (e.g., a person, organization or domain).

In one embodiment, the LDAP server 108 may include a callback order list 116, plug-in registration module 114, plug-in initialization module 118 and similar modules. In other embodiments, these modules may be implemented as plugins or similarly implemented to provide services to the LDAP server 108. Any number of plug-ins 122A-122C may be in communication with the LDAP server 108 and provide any number of services to the LDAP server 108.

In one embodiment, each plug-in 122A-122C may be initiated by a plug-in initialization module 118. The plug-in initialization module 118 may select the plug-ins to be executed and the order in which the plug-ins are started. The start up of plug-ins may be controlled by the plug-in initialization module 118 during the boot sequence for the LDAP directory server 108. The plug-in initialization module 118 may also manage the initialization of plug-ins during the normal operation of the LDAP directory server 108. The plug-in initialization module 118 may be a discrete module or may be part of a plug-in management sub-system or module that manages communication and other interaction between the LDAP directory server 108 and the plug-ins 122A-122C.

In one embodiment, the plug-in registration module 114 may receive and service registration requests from plug-ins 122A-122C initialized by the plug-in initalization module 118. The registration module 114 may manage configuration data as well as the callback order list 116. The plug-ins 122A-122C register through the registration module 114 by sending messages or invoking functions or methods of the registration module 114 during the intialization of the plug-ins 122A-122C or after initialization. The registration process allows the plug-ins 122A-122C to notify the LDAP directory server 108 of their availability including the functions and services provided by the plug-ins 122A-C as well as the methods and functions available for use by other modules and subsystems.

The callback order list 116 is a data structure maintained by the LDAP directory server 108 to determine the order in which functions and services of plug-ins are utilized. If an LDAP operation utilizes multiple plug-in services or functions, directly or indirectly, the execution of the services or functions, that is the use of callbacks, is ordered according to the list to ensure the coherent operation of the system. The callback order list 116 may be used to enforce the order of callback execution by any module, plug-in, client, application or similar component of the LDAP system. For example, an LDAP operation may include callbacks to a first plug-in 122A and a second plug-in 122B. However, the callback to the first plug-in 122A requires the completion of a callback to second plug-in 122B. The callback order list 116 may be used to enforce this ordering, by placing the second plug-in at a higher priority, rank or similar position within an ordering hierarchy relative to the first plug-in; hence the relative order of execution can be guaranteed. The callback order list 116 may be any data structure capable of representing an order of items including a linked list, tree structure, flat list or similar data structure.

Figure 2:
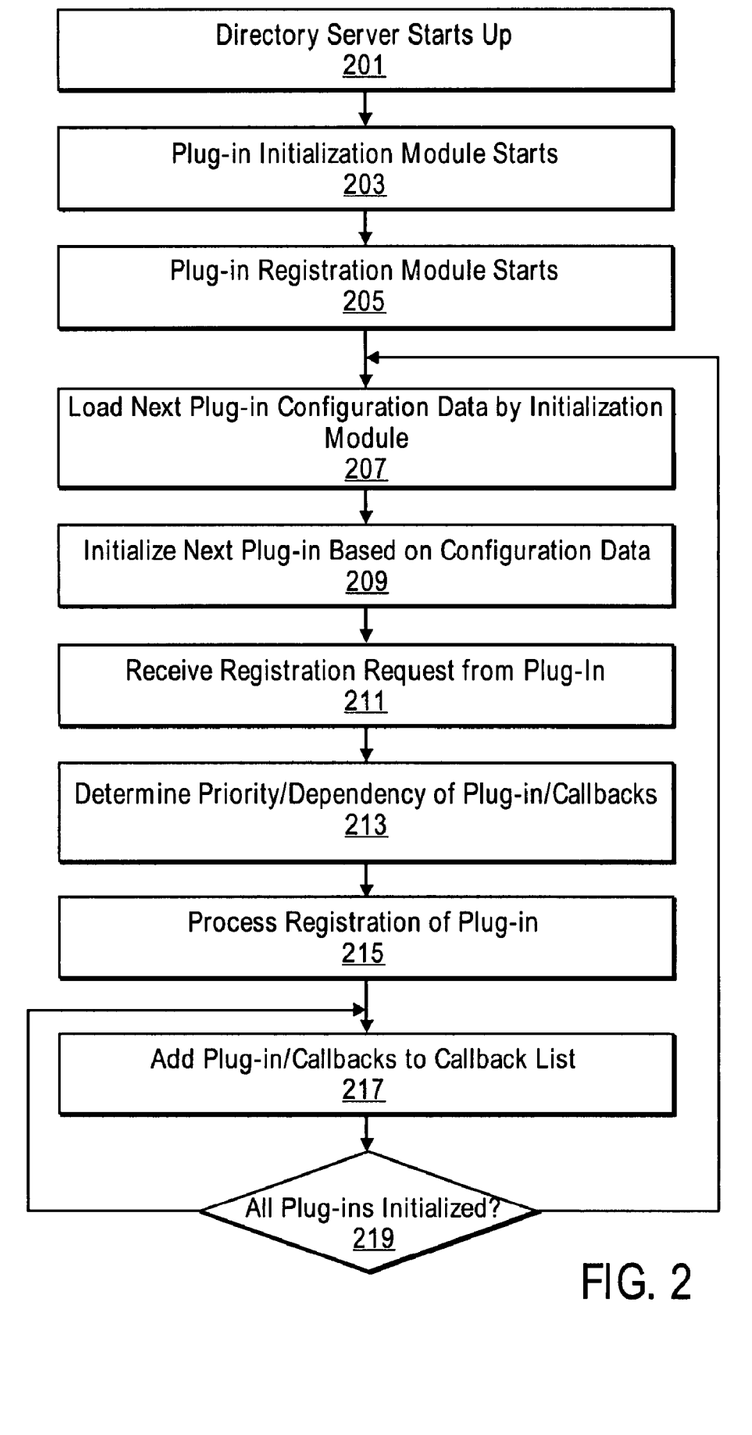
FIG. 2 is a flowchart of one embodiment of a process for ordering a callback list of an LDAP directory server.

FIG. 2 is a flowchart of one embodiment of a process for ordering a callback list of an LDAP server. In one embodiment, the process may be initiated when an LDAP directory server starts up (block 201). At this point the callback order list may be created, but is empty. In another embodiment, previous callback lists or default callback lists may be utilized and the entries in the list confirmed or similarly updated during the initialization process. The embodiments described herein assume for sake of clarity that a new ordered list is created upon start up of the LDAP directory server. One skilled in the art would understand that the concepts presented in this context are applicable to other starting scenarios.

At system startup, the plug-ins are not yet running and cannot be utilized by LDAP operations until they register and their callbacks are entered into the callback order list. LDAP operations may be executed using registered callbacks during startup even though not all of the plug-ins have completed registration, because relative order and dependencies between the plug-ins and callbacks will be preserved thereby ensuring data coherency and improving LDAP directory server efficiency.

During the initialization of the LDAP directory server each of its components are started including the plug-in initialization module (block 203). The plug-in initialization module may start the process of initializing each of the plug-ins for the LDAP directory server. The LDAP directory server may also initialize its registration module to service registration requests from the plug-ins (block 205). The registration module may record or start an insertion operation to add each plug-in to the callback order list. In another embodiment, a plug-in may have multiple callbacks associated with it. Each of these callbacks may be ordered separately allowing different callbacks of the same plug-in to have separate priorities and dependencies. The registration module may be initialized or start prior to, in parallel with or after the plug-in initialization module.

The plug-in initialization module may search for available plug-ins or may access a configuration file or entry in the LDAP repository to determine which plug-ins to initialize or which plug-ins are present. The plug-ins may be initialized serially or in parallel. For sake of clarity an embodiment with serial initialization is described. The principles and concepts present are equally applicable to parallel or multi-threaded initialization of plug-ins. The first plug-in may be identified and its configuration data may be accessed (block 207). The configuration data may include a set of users specified settings, default settings or administrator settings for the plug-in initialization parameters. These settings and parameters may be applied in the invocation, instantiation, execution or similar initialization of the plug-in (block 209). The plug-ins initialize and run as separate processes, threads or similarly execute.

After, the plug-in has been initialized or during the initialization process the plug-in may generate a registration request or call the registration module (block 211). The registration module may handle each of the registration requests in a first in first out, prioritized or similar processing order scheme. The registration module may retrieve configuration, priority and dependency data for each plug-in as its registration request is received from a configuration file or similar source (block 213). Priority and dependency data, as well as other data, may be stored as attribute values and retrieved using standard LDAP operations by the registration module, initialization module or other component of the LDAP directory server. In another embodiment, the registration requests may include the priority and dependency data. The registration module may either retrieve callback information for a plug-in requesting registration or the request may include information about the callbacks to be registered either separately or together with the plug-in.

The registration module processes the registration of each plug-in including analyzing the callbacks (block 215). The registration module may directly manage the insertion or addition of a callback to the callback order list or may utilize a separate dedicated callback insertion function that may either be a standalone function or a part of a library or application programming interface (API) (block 217). The callback insertion process determines the proper location of each plug-in or callback in the callback list and returns a success or fail feedback indicator to to the registration module. The plug-in registration module may continue to register plug-ins as the registration requests are received or stored in an input queue.

The plug-initialization module may continue to search or identify plug-ins to be initialized during the start up process or throughout the operation of the LDAP directory server. A check may be made to determine if all of the plug-ins have been initialized or if the search for plug-ins has completed (block 219). If all of the known plug-ins have not been initialized then the next plug-in is selected and initialized (block 207). If all of the known plug-ins have been initialized then the initialization process may be halted, rechecked intermittently (block 219) or similarly checked throughout the runtime of the LDAP directory server.

At the completion of the process a callback order list is created that ensures the proper order in the execution of plug-ins and callbacks for the LDAP directory server. Any module or plug-in may access the callback list as part of the enforcement of the list. A callback list may be structured to only include plug-ins, only include individual callbacks or to include a mix of plug-ins and individual callbacks.

Figure 3:
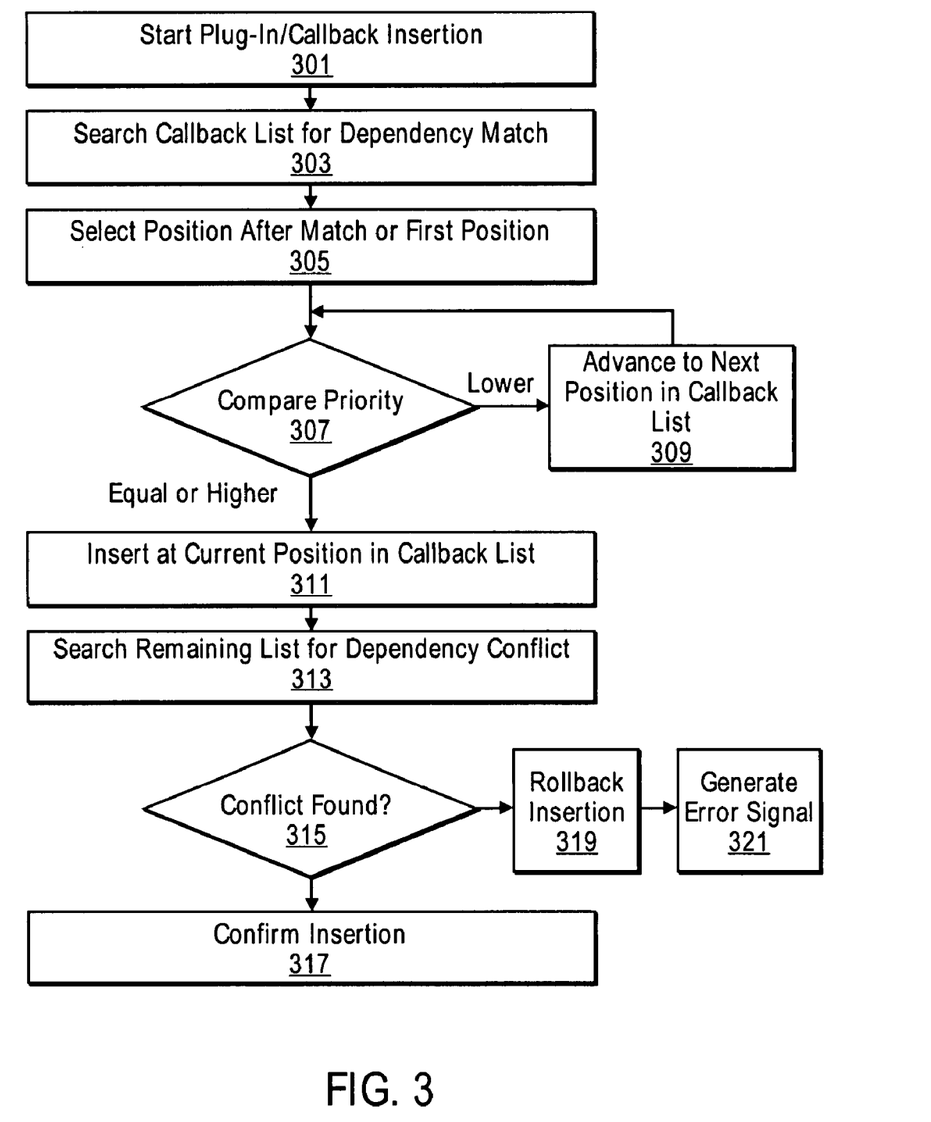
FIG. 3 is a flowchart of one embodiment of a process for callback insertion into an ordered list.

FIG. 3 is a flowchart of one embodiment of a process for callback insertion. In one embodiment, this insertion process may be a part of the registration module. In another embodiment, the insertion process may be a separate module or a part of a library or API. The insertion process may be started by a call during the registration of a plug-in or specific callback of a plug-in (block 301). The insertion process may receive the dependency and priority data of the plug-in or callback from the registration module or may retrieve this data from a configuration file or entry or from a similar location. The callback order list may be searched to find a match with any dependency of the current plug-in or callback (block 303). A dependency indicates that the current plug-in or callback is dependent on another plug-in or callback, that is, the current plug-in or callback must execute after the plug-in or callback upon which it depends.

A position for the next stage of the insertion process depends on the outcome of the search for a match to the dependency. If the plug-in or callback upon which the current plug-in or callback depends has already been registered and added to the callback order list, then the search continues from the position in the list after the position of the plug-in or callback from which it depends to ensure that the current callback or plug-in executes after its dependency (block 305). If the current callback or plug-in has more than one dependency then the dependency that is found deepest or latest in the callback order list sequence is used for this purpose and the process continues from the position after this dependency.

If the current plug-in or callback does not have any dependencies or if there are no matches in the callback order list then the process continues from the first position in the ordered callback list. This may occur if there are no dependencies for the current plug-in or callback or if the current plug-in or callback is one of the first to register.

A check is then made to compare the priority of the registering plug-in or callback with the plug-in or callback at the current position in the ordered callback list (block 307). If the registering plug-in or callback has a priority that is lower than that of the plug-in or callback at the current position in the list, then the process advances to the next position in the callback list (block 309). This comparison process may continue in this loop until the plug-in or callback in the current position has a lower priority, that is, the registering plug-in or callback has an equal or higher priority than the plug-in or call back at the current position.

If the registering plug-in or callback has a priority that is equal to or higher than the plug-in or callback at the current position in the ordered list then the registering plug-in or callback may be inserted at the current position (block 311). In one embodiment, this may push the plug-in or callback at this position to a lower or higher position in the ordered list to make room for the inserted plug-in or callback. In another embodiment, more than one plug-in or callback may be placed at the same level or tier in the ordered callback list. After insertion of the plug-in or callback, a search may be made of the remaining list to ensure that no dependency conflicts are present (block 313). A conflict may occur if the list has been corrupted or updated without mutual exclusion mechanisms or under similar conditions.

An outcome of the search is checked to determine if a conflict has been discovered (block 315). If a conflict is discovered, then the insertion may be rolled back or similarly undone (block 319). An error message may be generated and sent to the calling module, such as the registration module (block 321). If no conflict is found then the insertion may be confirmed (block 317). The confirmation may be a return from the insertion processing module, a return with an indicator of a successful insertion, a notification of a successful insertion, a storage of the modified ordered callback list or similar action.

Figure 4A:
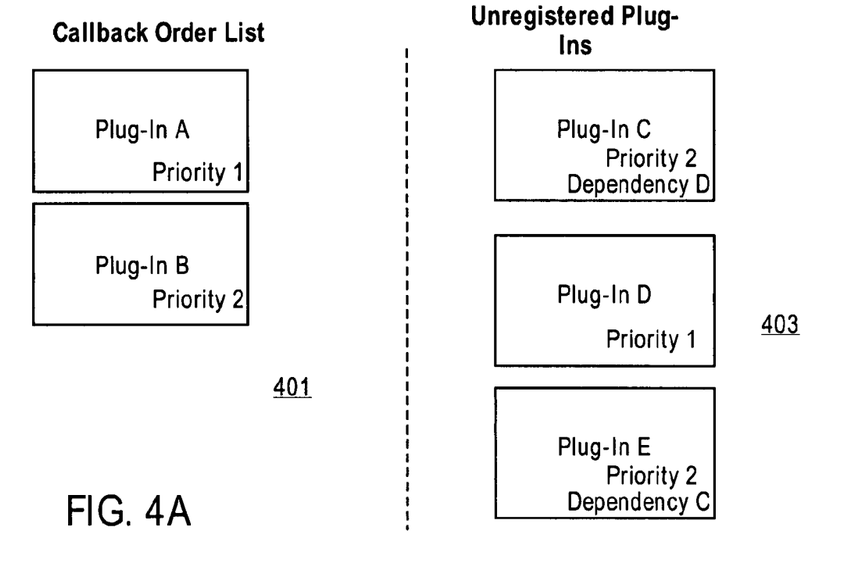
FIGS. 4A-D are diagrams of one example embodiment of a process for callback ordered list management.

FIGS. 4A-D are diagrams of one example embodiment of a process for callback list ordering. In the illustrated examples, five plug-ins are present in the LDAP directory server system of which two, plug-in A and plug-in B, have already been added to the ordered callback list. FIG. 4A is a diagram of the starting condition for the example. Plug-in A and plug-in B have been added to the callback order list 401. A set of unregistered plug-ins C-E remain to be registered 403. The unregistered plug-ins may be known to the system through a configuration file or entry, through a search process or through similar mechanisms. Each of the plug-ins has a priority. Plug-ins C and E have dependencies. The priority and dependency data may be stored in configuration files or entries or may be provided or coded into the plug-ins or similarly available to the LDAP directory server.

The illustrated callback order list 401 is ordered from top to bottom. The unregistered plug-ins are listed in the order that they are to be processed in this example, but there may be no guarantee of the order in which the plug-ins are initialized as it is a non-deterministic process. The top to bottom representation or order is for purposes of illustration and one skilled in the art would understand that the ordering is maintained based on the characteristics of the data structure used to implement the callback order list 401.

Figure 4B:
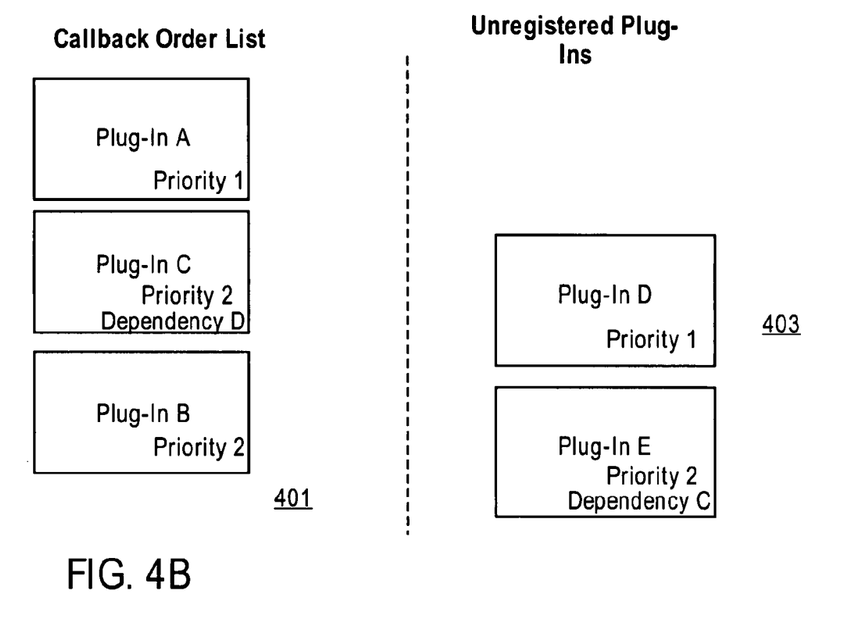

FIG. 4B is a diagram of the next state of the system after the plug-in C has been registered. The process of inserting plug-in C may start with a search of the callback order list for plug-in D, from which plug-in C depends. However, plug-in D is not yet in the callback order list. The search then continues from the first position with a comparison of the priority of plug-in A to plug-in C. Plug-in C has a lower priority, assuming a higher number in the example indicates a lower priority, and the process moves to the next position. Plug-in C is then compared to plug-in B, which has the same priority level. Plug-in C is then inserted into the callback order list 401 at this position. In this example embodiment, plug-in B is pushed back to the next position. In other embodiment, plug-in B may remain at the same level or tier as plug-in C, or may be moved ahead of plug-in C.

Figure 4C:
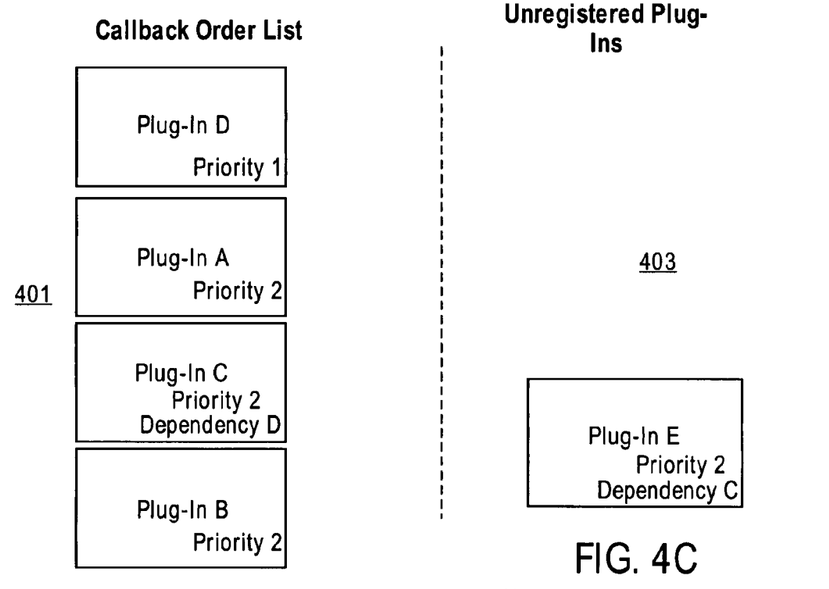

FIG. 4C is a diagram of the next state after the plug-in D has been registered. Plug-in D has no dependencies so the search starts at the beginning of the list. The search from the first position begins with a comparison of the priority of plug-in D to plug-in A, which has the same priority level. Plug-in D is then inserted into the callback order list 401 at this position. Plug-in A is pushed back to the next position and all subsequent plug-ins are similarly pushed back, such that the insertion does not affect the relative order of the other plug-ins in the callback order list. The insertion of plug-in D is also consistent with the dependency with plug-in C, so no error is generated.

Figure 4D:
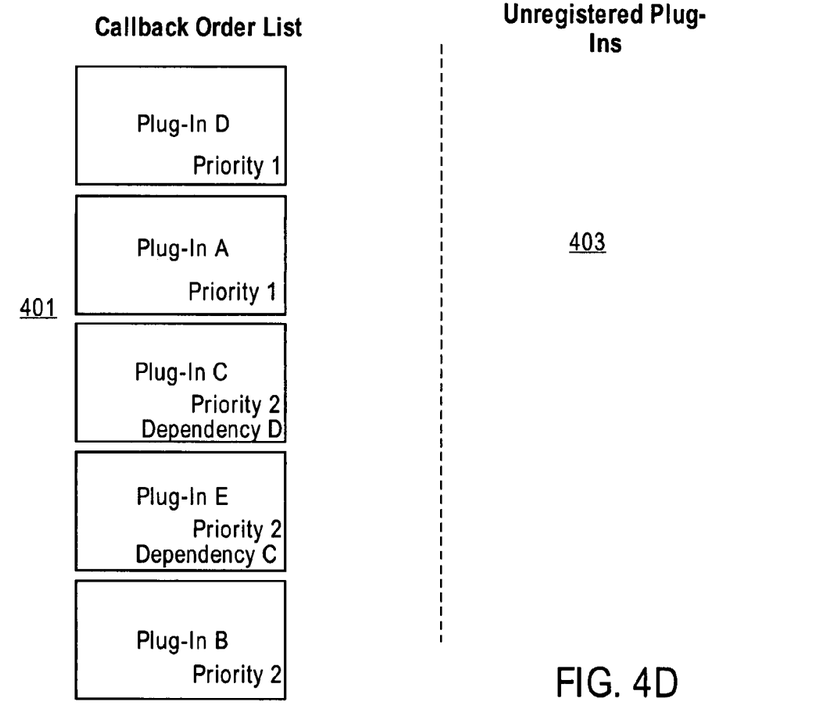

FIG. 4D is a diagram of the next state after the plug-in E has been registered. The process of inserting plug-in E may start with a search of the callback order list for plug-in C, from which plug-in E depends. Plug-in C is present in the list, so the search then continues from the position immediately subsequent to plug-in C with a comparison of the priority of plug-in E to plug-in B, which has the same priority level as plug-in E. Plug-in E is then inserted into the ordered callback list at this position. Plug-in B is pushed back to the next position.

Figure 5:
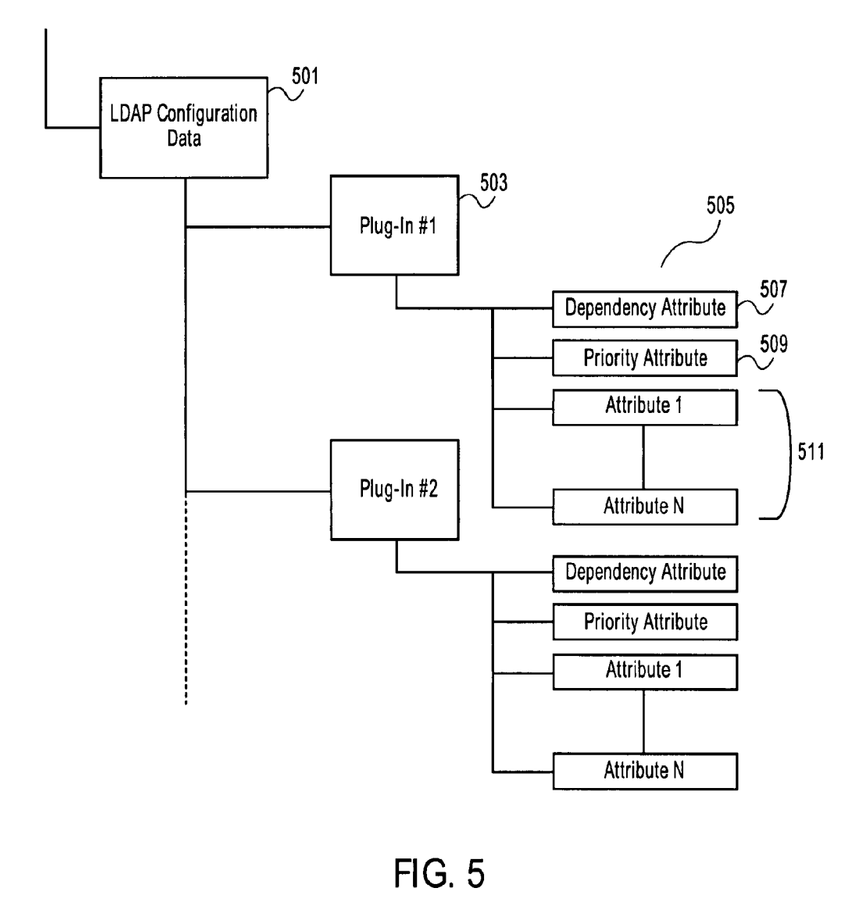
FIG. 5 is a diagram of one embodiment of an organization of an LDAP callback configuration entry or schema.

FIG. 5 is a diagram of one embodiment of an organization of an LDAP callback configuration entry or schema. In one embodiment, callback configuration or plug-in configuration data may be organized as a hierarchy or sub-tree within the overall LDAP configuration data 501. The LDAP configuration data 501 may include all configuration data for the LDAP directory server (not shown) and LDAP repository (not shown) as well as plug-ins 503 and similar modules. Plug-in configuration data may include configuration data for all aspects and sub-components of each plug-in, as well as, configuration data related to the callbacks 505 of the plug-in. In the illustrated embodiment, the plug-ins are registered and ordered as a whole. In another embodiment, each plug-in may have sub-sets of configuration data for individual callbacks that may be ordered separately according to their own priorities and dependencies. The plug-in or callback configuration data may include dependency attributes 507, priority attributes 509, as well as any number of other attributes 511, including user defined and virtual attributes. Dependency attribute values indicate other plug-ins or callbacks that this plug-in or callback depend from in regard to execution order. Priority attribute values indicate the level of importance assigned by a programmer, administrator, user or similar entity to the execution of the plug-in or callback.

Figure 6:
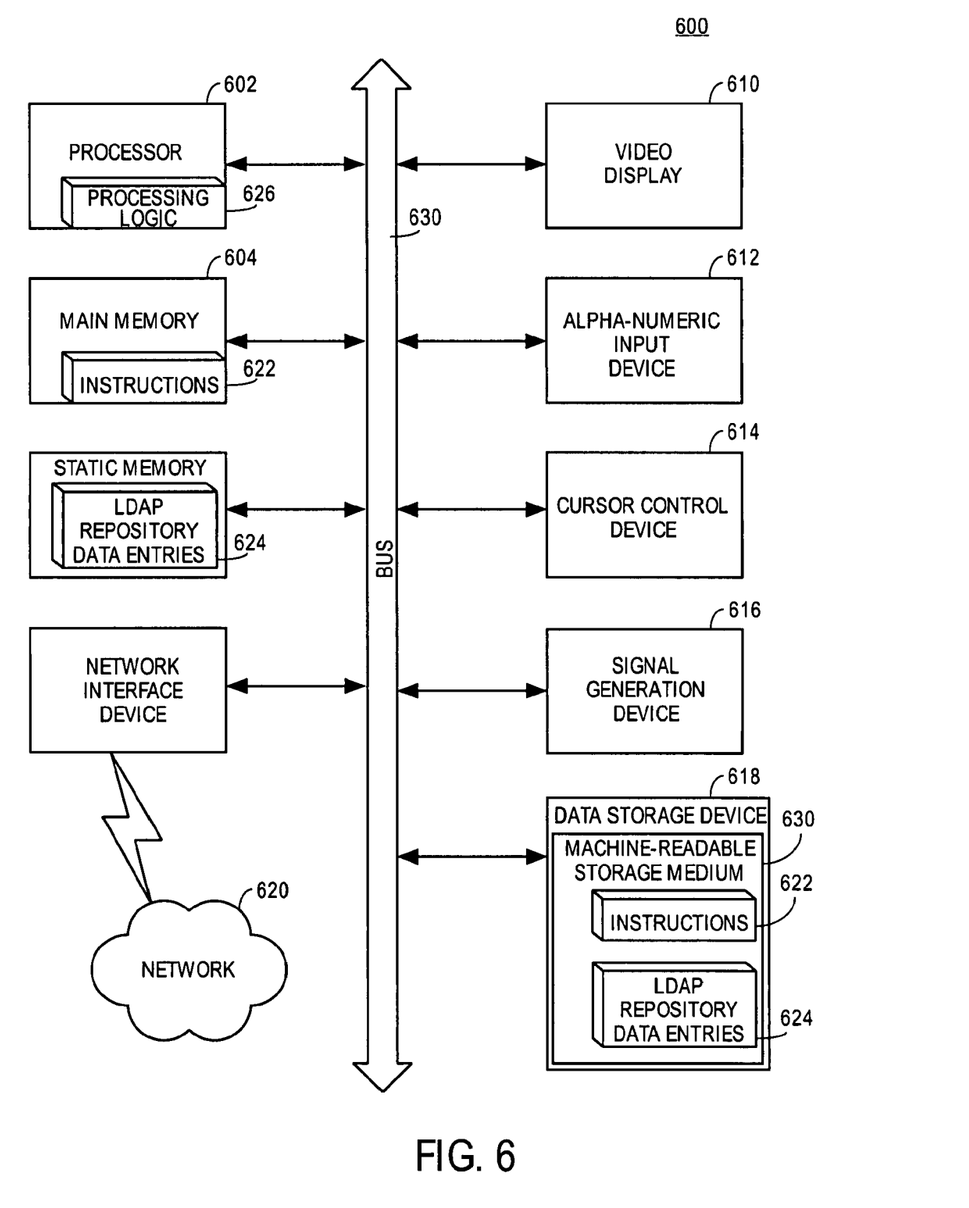
FIG. 6 is a diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server or a client machine in client-server network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 may represent one or more general-purpose processing devices such as a microprocessor, central processing unit or the like. More particularly, the processing device may be a complex instruction set computing (CISC) microprocessor, reduced instruction set computing (RISC) microprocessor, very long instruction word (VLIW) microprocessor, or processor implementing other instruction sets or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The machine-accessible storage medium 630 may also be used to store LDAP repository data entries 624. LDAP repository data entries 624 may also be stored in other sections of computer system 600, such as static memory 506.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Thus, a method and apparatus for managing an LDAP ordered callback list have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
retrieving, by a computing device executing a lightweight directory access protocol (LDAP) directory server, first callback data and second callback data from a first LDAP directory server plug-in;
inserting, by the computing device, the first callback data into a callback list at a first position and the second callback data into the callback list at a second position, the callback list determining an order of relative execution for a plurality of callbacks;
receiving a request to perform an operation that utilizes the first callback data and a third callback data of a second LDAP directory server plug-in;
making a determination of a relative order of the first callback data and the third callback data in the callback list;
executing a third callback associated with the third callback data before executing a first callback associated with the first callback data if the third callback data is ordered before the first callback data in the callback list; and
executing the first callback before executing the third callback if the first callback data is ordered before the third callback data in the callback list.

2. The method of claim 1, further comprising calling a plug-in initialization process that starts plug-ins in a determined order.

3. The method of claim 1, further comprising receiving a registration request from the first LDAP directory server plug-in.

4. The method of claim 1, further comprising processing a call according to a position of the first LDAP directory server plug-in in the callback list.

5. The method of claim 1, wherein a position of the first callback data in the callback list indicates an order for executing all callbacks of the first LDAP directory server plug-in.

6. The method of claim 1, wherein the first callback data comprises at least one of priority data or dependency data, and wherein the first callback data is inserted into a position in the callback list based on at least one of the priority data or the dependency data.

7. The method of claim 1, further comprising:
controlling a start up order of the first plug-in and the second plug-in during a boot up sequence for the LDAP directory server.

8. The method of claim 1, wherein the callback list further determines an order of relative execution of a plurality of plug-ins, wherein callback data associated with the plurality of plug-ins is inserted into the callback list.

9. A computing device comprising:
a memory to store instructions for a lightweight directory access protocol (LDAP) directory server; and
a processing device, coupled to the memory, to execute the instructions, wherein the processing device is configured to:
retrieve first callback data and second callback data from a first LDAP directory server plug-in;
insert the first callback data into a callback list at a first position and the second callback data into the callback list at a second position, the callback list determining an order of relative execution for a plurality of callbacks;
receive a request to perform an operation that utilizes the first callback data and third callback data of a second LDAP directory server plug-in;
make a determination of a relative order of the first callback data and the third callback data in the callback list;
execute a third callback associated with the third callback data before executing a first callback associated with the first callback data if the third callback data is ordered before the first callback data in the callback list; and
execute the first callback before executing the third callback if the first callback data is ordered before the third callback data in the callback list.

10. The computing device of claim 9, wherein the processing device is further configured to process a call according to a position of the first LDAP directory server plug-in in the callback list.

11. The computing apparatus of claim 9, wherein a position of the first callback data in the callback list indicates an order for executing all callbacks of the first LDAP directory server plug-in.

12. The computing apparatus of claim 9, wherein the first callback data comprises at least one of priority data or dependency data, and wherein the first callback data is inserted into a position in the callback list based on at least one of the priority data or the dependency data.

13. The computing device of claim 9, wherein the processing device is further configured to control a start up order of the first plug-in and the second plug-in during a boot up sequence for the LDAP directory server.

14. The computing device of claim 9, wherein the callback list further determines an order of relative execution of a plurality of plug-ins, wherein callback data associated with the plurality of plug-ins is inserted into the callback list.

15. A non-transitory machine readable medium having instructions that, when executed by a computing device, cause the computing device to perform a method comprising:
retrieving, by the computing device executing a lightweight directory access protocol (LDAP) directory server, first callback data and second callback data from a first LDAP directory server plug-in;
inserting, by the computing device, the first callback data into a callback list at a first position and the second callback data into the callback list at a second position, the callback list determining an order of relative execution for a plurality of callbacks;
receiving a request to perform an operation that utilizes the first callback data and third callback data of a second LDAP directory server plug-in;
making a determination of a relative order of the first callback data and the third callback data in the callback list;
executing a third callback associated with the third callback data before executing a first callback associated with the first callback data if the third callback data is ordered before the first callback data in the callback list; and
executing the first callback before executing the third callback if the first callback data is ordered before the third callback data in the callback list.

16. The non-transitory machine readable medium of claim 15, the method further comprising processing a call according to a position of the first LDAP directory server plug-in in the callback list.

17. The non-transitory machine readable medium of claim 15, wherein a position of the first callback data in the callback list indicates an order for executing all callbacks of the first LDAP directory server plug-in.

18. The non-transitory machine readable medium of claim 15, wherein the first callback data comprises at least one of priority data or dependency data, and wherein the first callback data is inserted into a position in the callback list based on at least one of the priority data or the dependency data.

19. The non-transitory machine readable medium of claim 15, the method further comprising controlling a start up order of the first plug-in and the second plug-in during a boot up sequence for the LDAP directory server.

20. The non-transitory machine readable medium of claim 15, wherein the callback list further determines an order of relative execution of a plurality of plug-ins, wherein callback data associated with the plurality of plug-ins is inserted into the callback list.

* * * * *